United States Patent
Paris et al.

(10) Patent No.: US 9,292,911 B2
(45) Date of Patent: Mar. 22, 2016

(54) AUTOMATIC IMAGE ADJUSTMENT PARAMETER CORRECTION

(71) Applicant: Adobe Systems Incorporated, San Jose, CA (US)

(72) Inventors: Sylvain P. Paris, Jamaica Plain, MA (US); Jen-Chan Chien, Saratoga, CA (US); Vladimir L. Bychkovsky, Cambridge, MA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/958,481

(22) Filed: Aug. 2, 2013

(65) Prior Publication Data

US 2013/0315476 A1 Nov. 28, 2013

Related U.S. Application Data

(63) Continuation of application No. 13/430,459, filed on Mar. 26, 2012.

(60) Provisional application No. 61/530,793, filed on Sep. 2, 2011.

(51) Int. Cl.
| | |
|---|---|
| G06T 5/00 | (2006.01) |
| G06T 11/00 | (2006.01) |
| G06K 9/00 | (2006.01) |
| H04N 1/32 | (2006.01) |

(52) U.S. Cl.
CPC ............ *G06T 5/009* (2013.01); *G06K 9/00275* (2013.01); *G06T 11/001* (2013.01); *G06K 9/00684* (2013.01); *G06T 2207/20081* (2013.01); *G06T 2207/20092* (2013.01); *H04N 1/32251* (2013.01)

(58) Field of Classification Search
CPC ........... G06T 5/00; G06T 5/007–5/009; G06T 5/001; G06T 11/001; G06T 2207/20081; G06T 2207/20092; H04N 1/40093; H04N 1/32251; G06K 9/00275; G06K 9/00684; G06K 9/4642
See application file for complete search history.

(56) References Cited

U.S. PATENT DOCUMENTS

| | | | |
|---|---|---|---|
| 4,975,970 | A | 12/1990 | Zettel et al. |
| 5,193,628 | A | 3/1993 | Hill, III et al. |
| 5,278,602 | A | 1/1994 | Honma et al. |
| 5,386,483 | A | 1/1995 | Shibazaki |
| 5,426,684 | A * | 6/1995 | Gaborski et al. ............... 378/62 |
| 5,742,698 | A | 4/1998 | Minami et al. |
| 6,373,991 | B1 * | 4/2002 | Shimazu ............... G06T 3/4007 382/169 |
| 6,404,512 | B1 | 6/2002 | Tone |
| 6,473,084 | B1 | 10/2002 | Phillips et al. |
| 6,687,528 | B2 | 2/2004 | Gupta et al. |

(Continued)

OTHER PUBLICATIONS

"Non-Final Office Action", U.S. Appl. No. 13/036,245, (Mar. 29, 2013), 17 pages.

(Continued)

*Primary Examiner* — Manav Seth
(74) *Attorney, Agent, or Firm* — Wolfe-SBMC

(57) ABSTRACT

Techniques are disclosed relating to modifying an automatically predicted adjustment. In one embodiment, the automatically predicted adjustment may be adjusted, for example, based on a rule. The automatically predicted adjustment may be based on a machine learning prediction. A new image may be globally adjusted based on the modified automatically predicted adjustment.

18 Claims, 10 Drawing Sheets

(56) References Cited

U.S. PATENT DOCUMENTS

| | | | |
|---|---|---|---|
| 6,718,193 B2 | 4/2004 | Knoplioch et al. | |
| 6,738,154 B1 | 5/2004 | Venable | |
| 6,741,655 B1 | 5/2004 | Chang et al. | |
| 6,757,412 B1 | 6/2004 | Parsons et al. | |
| 6,778,691 B1* | 8/2004 | Barski | H04N 1/4072 250/587 |
| 6,798,536 B1 | 9/2004 | Muramoto | |
| 6,826,310 B2* | 11/2004 | Trifonov | G06T 5/40 382/168 |
| 6,961,066 B2 | 11/2005 | James | |
| 7,120,303 B2 | 10/2006 | Mitchell et al. | |
| 7,158,686 B2* | 1/2007 | Gindele | G06T 5/009 382/169 |
| 7,174,049 B2 | 2/2007 | Bhattacharjya | |
| 7,191,106 B2 | 3/2007 | Minor et al. | |
| 7,286,131 B2 | 10/2007 | Brodie et al. | |
| 7,319,787 B2* | 1/2008 | Trifonov | G06T 5/40 382/168 |
| 7,375,848 B2 | 5/2008 | Nakami et al. | |
| 7,409,151 B2 | 8/2008 | Kato et al. | |
| 7,451,065 B2 | 11/2008 | Pednault et al. | |
| 7,522,781 B2 | 4/2009 | Lee | |
| 7,719,574 B2 | 5/2010 | Nakami et al. | |
| 7,739,054 B2 | 6/2010 | Carrick et al. | |
| 7,817,817 B2 | 10/2010 | Wu et al. | |
| 7,821,570 B2* | 10/2010 | Gallagher et al. | 348/364 |
| 8,111,923 B2 | 2/2012 | Csurka et al. | |
| 8,120,569 B2 | 2/2012 | Jou et al. | |
| 8,150,202 B2 | 4/2012 | Mohanty et al. | |
| 8,264,576 B2 | 9/2012 | Susanu et al. | |
| 8,264,676 B2* | 9/2012 | Kanellopoulos et al. | 356/73.1 |
| 8,280,184 B2* | 10/2012 | Chen | G06T 5/007 382/274 |
| 8,290,295 B2 | 10/2012 | Criminisi et al. | |
| 8,358,839 B2 | 1/2013 | Monga et al. | |
| 8,422,794 B2 | 4/2013 | Ptucha et al. | |
| 8,666,148 B2 | 3/2014 | Paris et al. | |
| 8,787,659 B2 | 7/2014 | Paris et al. | |
| 8,903,169 B1 | 12/2014 | Paris et al. | |
| 9,008,415 B2 | 4/2015 | Paris et al. | |
| 9,020,243 B2 | 4/2015 | Paris et al. | |
| 9,070,044 B2 | 6/2015 | Paris et al. | |
| 2002/0027603 A1 | 3/2002 | Kuwata et al. | |
| 2002/0044293 A1 | 4/2002 | Fukasawa | |
| 2002/0140693 A1 | 10/2002 | Nakami et al. | |
| 2002/0140952 A1 | 10/2002 | Fukasawa | |
| 2003/0011622 A1 | 1/2003 | Yomdin et al. | |
| 2003/0035159 A1 | 2/2003 | Nakami | |
| 2003/0053095 A1 | 3/2003 | Nakami | |
| 2003/0053690 A1 | 3/2003 | Trifonov et al. | |
| 2003/0080985 A1 | 5/2003 | Kagawi et al. | |
| 2004/0125112 A1* | 7/2004 | James | 345/589 |
| 2004/0190789 A1* | 9/2004 | Liu et al. | 382/274 |
| 2005/0100242 A1* | 5/2005 | Trifonov et al. | 382/274 |
| 2006/0039601 A1 | 2/2006 | Nair et al. | |
| 2006/0143731 A1 | 6/2006 | Timmis et al. | |
| 2006/0244980 A1 | 11/2006 | Grace | |
| 2006/0292619 A1 | 12/2006 | Carrick et al. | |
| 2007/0086624 A1 | 4/2007 | Breed et al. | |
| 2007/0126921 A1 | 6/2007 | Gallagher et al. | |
| 2007/0140578 A1 | 6/2007 | Okutsu | |
| 2007/0237370 A1 | 10/2007 | Zhou et al. | |
| 2007/0242869 A1 | 10/2007 | Luo et al. | |
| 2007/0247650 A1 | 10/2007 | Nakami | |
| 2007/0291048 A1 | 12/2007 | Kerofsky | |
| 2008/0002030 A1 | 1/2008 | Sakurai et al. | |
| 2008/0020363 A1 | 1/2008 | Chang | |
| 2008/0025562 A1* | 1/2008 | Takemoto | 382/100 |
| 2008/0025563 A1* | 1/2008 | Takemoto | 382/100 |
| 2008/0025589 A1 | 1/2008 | Ma et al. | |
| 2008/0068328 A1 | 3/2008 | Jou et al. | |
| 2008/0069445 A1 | 3/2008 | Weber | |
| 2008/0075367 A1 | 3/2008 | Winn et al. | |
| 2008/0085044 A1 | 4/2008 | Zhou et al. | |
| 2008/0088857 A1 | 4/2008 | Zimmer et al. | |
| 2008/0101697 A1 | 5/2008 | Cho et al. | |
| 2008/0130964 A1* | 6/2008 | Zwirn et al. | 382/128 |
| 2008/0137986 A1* | 6/2008 | Liu et al. | 382/274 |
| 2008/0158580 A1 | 7/2008 | Okamoto | |
| 2008/0165247 A1* | 7/2008 | Beresford et al. | 348/65 |
| 2008/0198396 A1 | 8/2008 | Nakami et al. | |
| 2008/0219586 A1 | 9/2008 | Watanabe et al. | |
| 2008/0226148 A1 | 9/2008 | Gu et al. | |
| 2008/0237370 A1 | 10/2008 | Turnbull et al. | |
| 2008/0240605 A1* | 10/2008 | Enjuji | 382/274 |
| 2008/0260274 A1 | 10/2008 | Winder et al. | |
| 2008/0279467 A1 | 11/2008 | Liu et al. | |
| 2008/0285853 A1* | 11/2008 | Bressan | 382/169 |
| 2008/0298704 A1 | 12/2008 | Nachlieli et al. | |
| 2008/0317358 A1 | 12/2008 | Bressan et al. | |
| 2009/0103806 A1 | 4/2009 | Nakami | |
| 2009/0167893 A1 | 7/2009 | Susanu et al. | |
| 2009/0290807 A1 | 11/2009 | Marchesotti | |
| 2010/0014776 A1 | 1/2010 | Marchesotti | |
| 2010/0053384 A1 | 3/2010 | Manabe | |
| 2010/0067865 A1 | 3/2010 | Saxena et al. | |
| 2010/0157078 A1 | 6/2010 | Atanassov et al. | |
| 2010/0166301 A1 | 7/2010 | Jeon | |
| 2010/0201883 A1 | 8/2010 | Delva et al. | |
| 2010/0226547 A1* | 9/2010 | Criminisi et al. | 382/128 |
| 2010/0265359 A1 | 10/2010 | Nakami et al. | |
| 2010/0322509 A1 | 12/2010 | Shimizu et al. | |
| 2011/0025886 A1 | 2/2011 | Steinberg et al. | |
| 2011/0058823 A1 | 3/2011 | Hirai | |
| 2011/0123133 A1* | 5/2011 | Mohanty et al. | 382/274 |
| 2011/0206280 A1* | 8/2011 | Lee | 382/167 |
| 2011/0229019 A1* | 9/2011 | Batur | H04N 5/217 382/159 |
| 2011/0243473 A1 | 10/2011 | Chen et al. | |
| 2011/0279711 A1 | 11/2011 | Sakurai et al. | |
| 2011/0292246 A1* | 12/2011 | Brunner | 348/231.99 |
| 2012/0045095 A1 | 2/2012 | Tate et al. | |
| 2012/0057781 A1 | 3/2012 | Morovic et al. | |
| 2012/0082397 A1 | 4/2012 | Zhai et al. | |
| 2012/0207359 A1* | 8/2012 | Konukoglu et al. | 382/128 |
| 2012/0213440 A1 | 8/2012 | Tappen et al. | |
| 2012/0219218 A1 | 8/2012 | Demandolx | |
| 2012/0233816 A1 | 9/2012 | Zhang et al. | |
| 2012/0237130 A1 | 9/2012 | Wang et al. | |
| 2012/0256941 A1 | 10/2012 | Ballestad et al. | |
| 2012/0308132 A1 | 12/2012 | Zimmer | |
| 2013/0002814 A1 | 1/2013 | Park et al. | |
| 2013/0108183 A1 | 5/2013 | Bruls et al. | |
| 2013/0121566 A1 | 5/2013 | Paris | |
| 2013/0129196 A1 | 5/2013 | Paris et al. | |
| 2013/0129214 A1 | 5/2013 | Toda | |
| 2013/0188866 A1 | 7/2013 | Obrador et al. | |
| 2013/0257883 A1 | 10/2013 | Krig et al. | |
| 2013/0314568 A1 | 11/2013 | Vrănceanu et al. | |
| 2013/0315479 A1 | 11/2013 | Paris | |
| 2013/0322739 A1 | 12/2013 | Paris | |
| 2014/0002478 A1 | 1/2014 | Ballestad et al. | |
| 2014/0010448 A1 | 1/2014 | Lischinski et al. | |
| 2014/0133744 A1 | 5/2014 | Paris et al. | |
| 2014/0185930 A1 | 7/2014 | Su et al. | |

OTHER PUBLICATIONS

"U.S. Application as Filed", U.S. Appl. No. 13/036,245, (Feb. 28, 2011), 46 pages.

Adams, "Book—The Negative: Exposure and Development Basic Photo 2", *Morgan and Lester*, (1948), All pages.

Adams, "Book—The Print: Contact Printing and Enlarging", *Morgan and Lester*, (1950), All pages.

Bae, Soonmin et al., "Two-Scale Tone Management for Photographic Look", *ACM Transactions on Graphics*, 25(3), *Proceedings of the ACM SIGGRAPH Conference*, (2006), 9 pages.

Dale, Kevin et al., "Image Restoration Using Online Photo Collections", *Proceedings of IEEE Conference on Computer Vision*, (Sep. 2009), 8 pages.

Datta, Ritendra et al., "Studying Aesthetics in Photographic Images Using a Computational Approach", *Proceedings of the European Conference on Computer Vision*, (2006), 14 pages.

(56) References Cited

OTHER PUBLICATIONS

Eisman, et al., "Book—Adobe Photoshop Restoration & Retouching", *New Riders Press*, ISBN: 0321316274, (2006), All pages.
Gehler, Peter V., et al., "Bayesian Color Constancy Revisited", *Proceedings of the Conference on Computer Vision and Pattern Recognition*, (2008), 8 pages.
Hastie, et al., "Book—The Elements of Statistical Learning: Data Mining, Inference, and Prediction", *Springer-Verlag*, ISBN: 0387848576, (2009), All pages.
Hertzmann, Aaron et al., "Image Analogies", *Proceedings of SIGGRAPH 2001*, (2001), 14 pages.
Kang, Sing B., et al., "Personalization of Image Enhancement", *Proceedings of the Conference on Computer Vision and Pattern Recognition*, (2010), 8 pages.
Krause, et al., "Near-Optimal Sensor Placements in Gaussian Processes: Theory, Efficient Algorithms and Empirical Studies", *The Journal of Machine Learning Research vol. 9*, (Jun. 1, 2008), pp. 235-284.
Luo, Yiwen et al., "Photo and Video Quality Evaluation: Focusing on the Subject", *Proceedings of the European Conference on Computer Vision*, (2008), 14 pages.
Margulis, "Book—Photoshop LAB Color: The Canyon Conundrum and Other Adventures in the Most Powerful Colorspace", *Peachpit Press*, ISBN: 0321356780,(2005), All pages.
Rasmussen, Carl E., "Gaussian Processes in Machine Learning", *MIT Press*(2006), 9 pages.
Reinhard, et al., "Book—High Dynamic Range Imaging: Acquisition, Display, and Image-Based Lighting", *Morgan Kaufman Publishers*, (2010), All pages.
Tenenbaum, et al., "Separating Style and Content", *Proceedings of the Conference on Advances in Neural Information Processing Systems, 1997*, (Dec. 1996), 9 pages.
"Non-Final Office Action", U.S. Appl. No. 13/958,486, (Sep. 24, 2013),17 pages.
Ahmad et al.,"Image-Processing Pipeline for Highest Quality Images", World Academy of Science, Engineering and Technology 35, Nov. 2009, pp. 216-219.
"Non-Final Office Action", U.S. Appl. No. 13/958,469, Oct. 22, 2013, 13 pages.
"Non-Final Office Action", U.S. Appl. No. 13/430,459, Oct. 11, 2013, 14 pages.
"Non-Final Office Action", U.S. Appl. No. 13/430,488, Oct. 21, 2013, 15 pages.
"Notice of Allowance", U.S. Appl. No. 13/036,245, Oct. 15, 2013, 13 pages.
"Final Office Action", U.S. Appl. No. 13/430,459, filed Mar. 20, 2014, 18 pages.
"Final Office Action", U.S. Appl. No. 13/430,488, filed Mar. 12, 2014, 18 pages.
"Final Office Action", U.S. Appl. No. 13/958,469, filed Mar. 26, 2014, 16 pages.
"Final Office Action", U.S. Appl. No. 13/958,486, filed Apr. 25, 2014, 16 pages.
"Non-Final Office Action", U.S. Appl. No. 13/430,459, filed May 8, 2014, 22 pages.
"Non-Final Office Action", U.S. Appl. No. 13/430,488, filed May 7, 2014, 18 pages.
"Notice of Allowance", U.S. Appl. No. 13/958,469, filed May 1, 2014, 7 pages.
Zeng, "Color Characterization for Inkjet Copiers", Proc. SPIE 6807, Color Imaging XIII: Processing, Hardcopy, and Applications, 68070X, Jan. 28, 2008, 8 pages.
"Final Office Action", U.S. Appl. No. 13/430,459, Sep. 3, 2014, 5 pages.
"Non-Final Office Action", U.S. Appl. No. 14/159,364, Aug. 1, 2014, 17 pages.
"Notice of Allowance", U.S. Appl. No. 13/430,488, Aug. 25, 2014, 7 pages.
"Supplemental Notice of Allowance", U.S. Appl. No. 13/958,469, Jun. 23, 2014, 2 pages.
Puschel, et al.,' "Spiral: Code Generation for DSP Transforms", Proceedings of the IEEE, vol. 93, No. 2, Feb. 2005, pp. 232-275.
"Notice of Allowance", U.S. Appl. No. 13/430,459, Dec. 31, 2014, 6 pages.
"Notice of Allowance", U.S. Appl. No. 13/958,486, Jan. 13, 2015, 7 pages.
"Notice of Allowance", U.S. Appl. No. 14/159,364, Jan. 28, 2015, 7 pages.
"Supplemental Notice of Allowance", U.S. Appl. No. 13/430,459, Mar. 17, 2015, 2 pages.
"Corrected Notice of Allowance", U.S. Appl. No. 13/430,488, Sep. 25, 2014, 2 pages.

* cited by examiner

AUTOMATIC IMAGE ADJUSTMENT PARAMETER CORRECTION

PRIORITY INFORMATION

This application claims benefit of priority of U.S. patent application Ser. No. 13/430,459, filed Mar. 26, 2012, which claims benefit of priority of U.S. Provisional Application Serial No. 61/530,793, entitled "Automatic Tone Curve Correction" filed Sep. 2, 2011, the content of each of which is incorporated by reference herein in its entirety.

BACKGROUND

1. Technical Field

This disclosure relates generally to image adjustment and, more specifically, to automatic image adjustments.

2. Description of the Related Art

Adjusting photographs is a tedious process that requires skill and time. The difference between a picture that comes straight from the camera and a carefully adjusted one can be dramatic just by balancing the tones and revealing the interplay of light. To adjust a photograph, photographers need to consider the image content and the tonal challenges it presents. Even adjusting contrast and tonal balance is challenging because it must take into account the photo subject and lighting conditions.

Decision factors in photograph adjusting are often subjective and cannot be directly embedded into algorithmic procedures. Some photo editing packages offer automatic adjustment; however, many offer a simple heuristic that fails to address more complex adjustments that depend upon scene characteristics such as low versus high key, scenes with backlighting, or other difficult lighting situations. Other packages may apply simple rules, such as fixing the black and white points of the image to the darkest and brightest pixels. Although this may work in simple cases, these approaches fail in more complex examples, in which a photographer would apply more sophisticated modifications. Because of the complexities inherent in photograph adjusting, simple rule-based automatic techniques for adjusting photographs often fail.

SUMMARY

This disclosure describes techniques and structures that facilitate automatically modifying an automatically predicted adjustment. In one embodiment, an automatically predicted adjustment may be adjusted, for example, based on a rule. For instance, a rule may include a bound (e.g., upper and/or lower) for the automatically predicted adjustment. As one non-limiting example, the automatically predicted adjustment may be a tone curve. In some embodiments, the automatically predicted adjustment may be based on a machine learning prediction. A new image may then be globally adjusted based on the modified automatically predicted adjustment.

Figure 1:
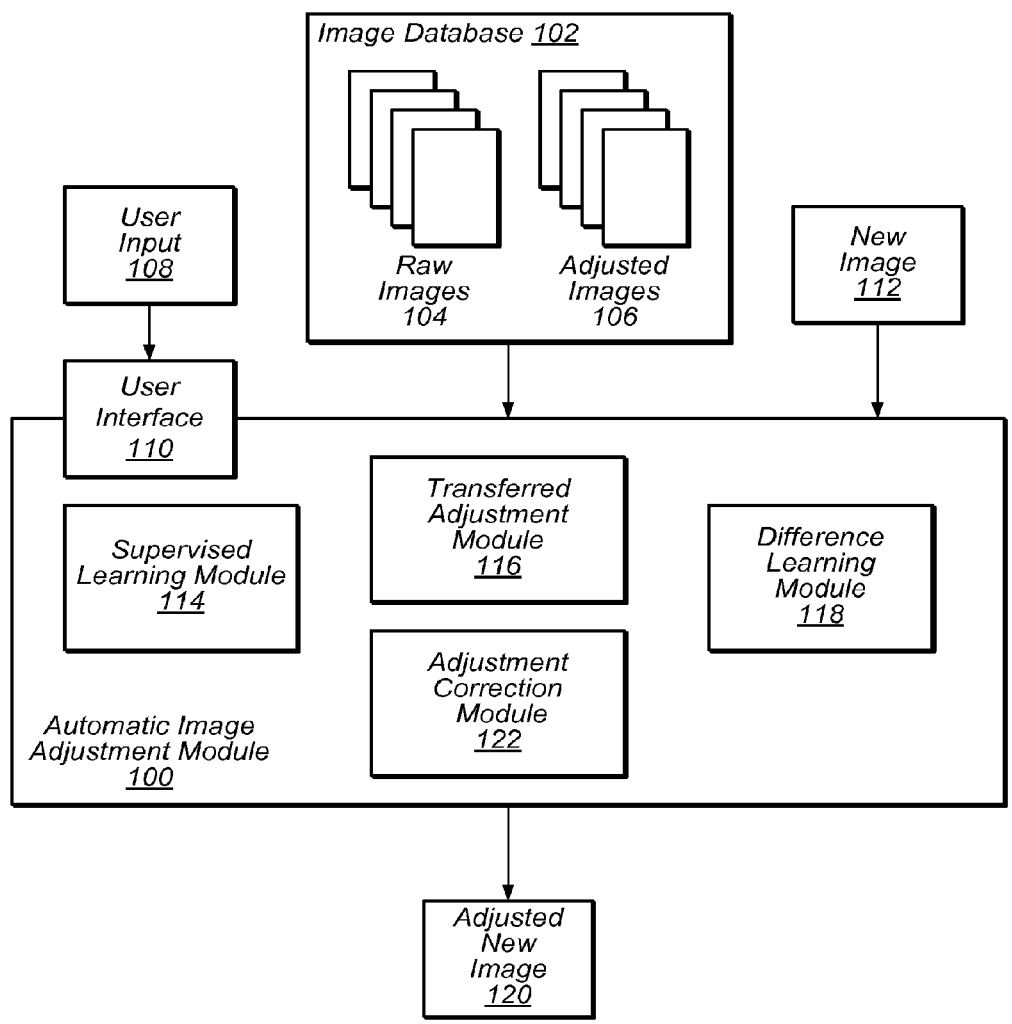
FIG. 1 illustrates an example module that may implement an automatic image adjustment method and/or an automatic image adjustment parameter modification method, according to some embodiments.

While the disclosure is described herein by way of example for several embodiments and illustrative drawings, those skilled in the art will recognize that the disclosure is not limited to the embodiments or drawings described. It should be understood, that the drawings and detailed description thereto are not intended to limit the disclosure to the particular form disclosed, but on the contrary, the intention is to cover all modifications, equivalents and alternatives falling within the spirit and scope of the present disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, the terms "first" and "second" tone curves can be used to refer to any of a plurality of tone curves. In other words, "first" and "second" tone curves are not limited to logical tone curves 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Various embodiments of automatic image adjustment parameter (e.g., tone curve) modification/correction are described. In embodiments, an automatic image adjustment module may modify at least one of the one or more image adjustment parameters (e.g., tone curve) based on a rule, and globally adjust a new image based on the modified adjustment parameter to create an adjusted new image.

Some embodiments may include a means for automatically adjusting an image and/or a means for automatically modifying/correcting an image adjustment parameter. For example, an automatic image adjustment module may receive and/or generate one or more adjustment parameters (e.g., tone curve(s)), modify at least one of the one or more adjustment parameters based on a rule, and globally adjust one or more parameters of a new image using the modified adjustment parameter to create an adjusted new image, as described herein. The automatic image adjustment module may, in some embodiments, be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving and/or generating one or more adjustment parameters (e.g., tone curve(s)), modifying at least one of the one or more adjustment parameters based on a rule, and globally adjusting one or more parameters of a new image using the modified adjustment parameter to create an adjusted new image, as described herein. Other embodiments of the automatic image adjustment module may be at least partially implemented by hardware circuitry and/or firmware stored, for example, in a non-volatile memory.

This specification first describes an illustrative module that may implement certain embodiments of the methods disclosed herein. The specification then discloses several example techniques for generating image adjustment parameters (e.g., tone curves) as well as techniques for automatically correcting the image adjustment parameters. Various examples and applications are also disclosed. While the specification describes various embodiments in terms of tone curves for ease of understanding, the disclosed techniques apply equally to other image adjustment parameters (e.g., other image adjustment parameters generated from machine-based (e.g. supervised), learning).

Turning now to FIG. 1, automatic image adjustment module 100 may implement one or more embodiments of automatic image adjustment parameter modification, as described herein. In the embodiment shown, automatic image adjustment module 100 may receive image database 102, which may include image pairs of raw images 104 and corresponding adjusted images 106. Automatic image adjustment module may also receive user input 108 (via user interface 110) and new image 112, and may output an adjusted version of new image 112, adjusted new image 120.

Figure 2A:
FIGS. 2A-2F show an example of a raw image and examples of corresponding adjusted images.
Figure 2B:
Figure 2C:
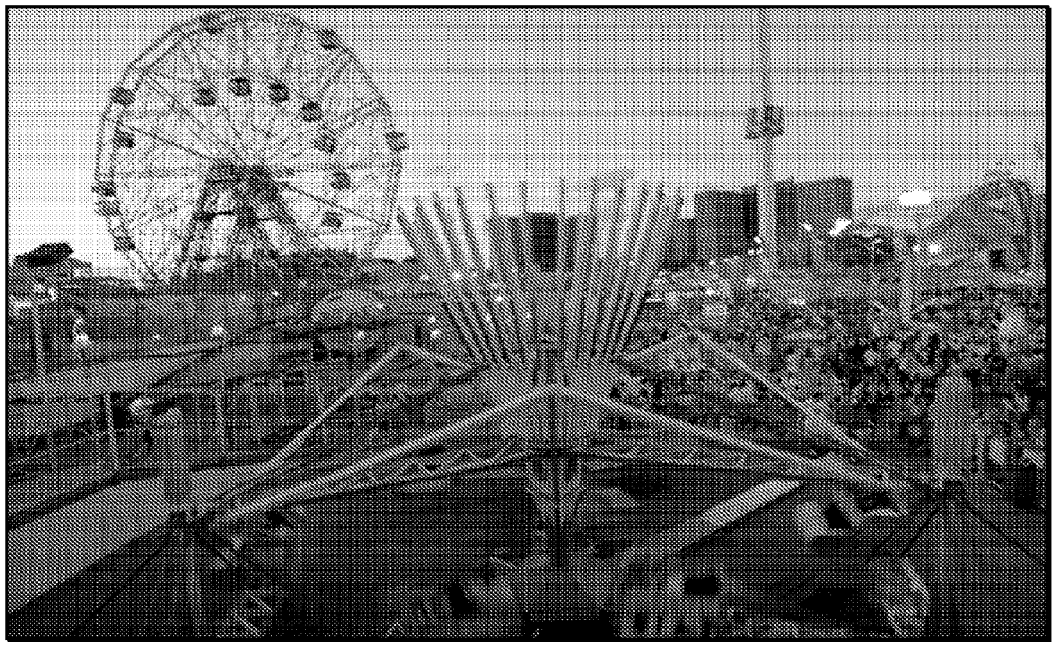
Figure 2D:
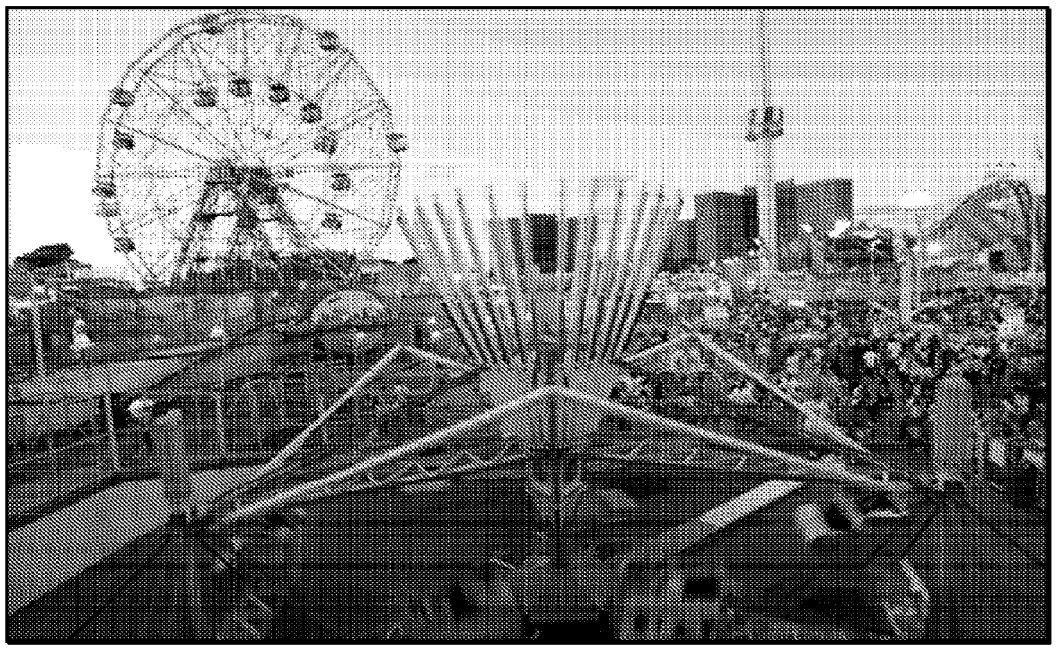
Figure 2E:
Figure 2F:
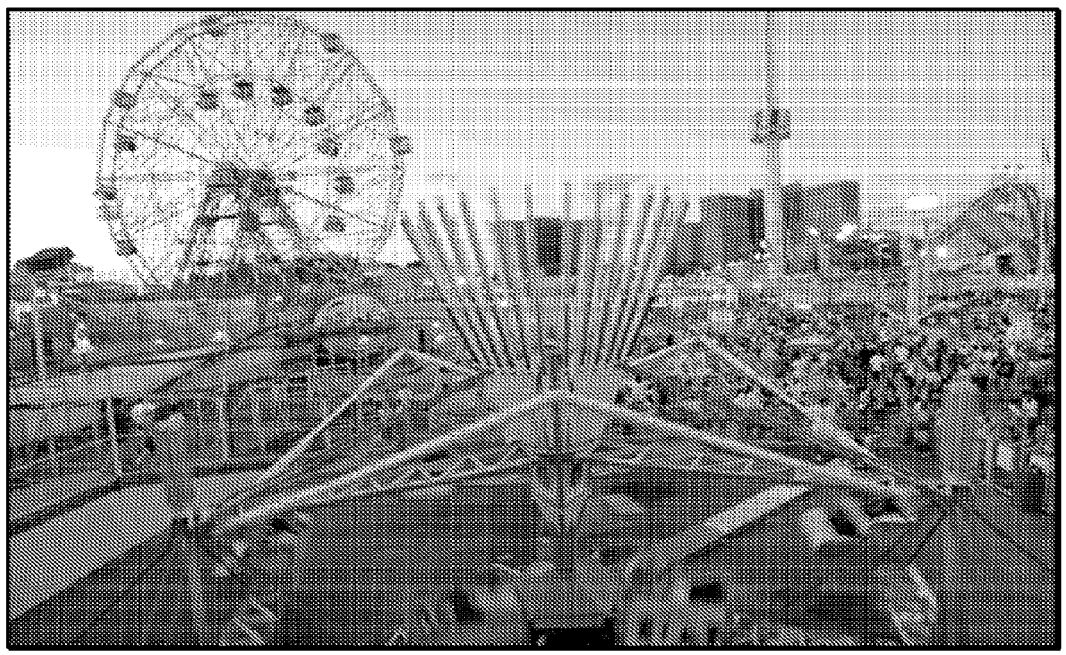

In one embodiment, image database 102 may include a plurality of photographs. For example, image database 102 may include 5000 raw images 104, which may be the original RAW format images straight from the camera (e.g., such that all the information recorded by the camera sensor is available) and may also include adjusted versions of the RAW images, adjusted images 106. The images may cover a variety of scenes, subjects, and lighting conditions. For example, the dataset of raw images 102 may include difficult cases such as images with back-lighting and foggy scenes. In one embodiment, the image resolution of raw images 102 may range from 6 to 21 megapixels. The dataset may contain photos from a variety of different cameras and lenses. Raw images 102 may include images taken using automatic exposure and may also include images taken in which the exposure was manually set. In one embodiment, image database 102 may include multiple sets of adjusted images 106. For example, image database 102 may include five sets of 5000 adjusted images 106 that correspond to the 5000 raw images 104. In this example, an image pair may be a raw image 104 and one of the corresponding adjusted images 106 from any of the five sets. One example of a type of adjustment made to raw images 104 that may be reflected in adjusted images 106 includes tonal adjustments. Adjusted images 106 may be the result of adjusting raw images 104 with image editing or retouching software. This software may provide an interface composed of several sliders and a tone curve to perform adjustments, such as brightness, contrast, exposure, and black level. In one embodiment, adjusted images 106 may be adjusted using sliders of retouching software that correspond to a global remapping of pixel values. This may include fourteen controls for the tone curve and two controls for the white balance. In addition, adjusted images 106 may also include adjustments made by using a slider that selectively brightens shadow regions of an image. An example of a raw image 104 and corresponding adjusted images 106 are shown in FIGS. 2A-F. An example raw image 104 is shown in FIG. 2B and five corresponding adjusted images 106 are shown in FIGS. 2B through 2F. In the example shown in FIG. 2, five retouchers have produced diverse adjusted versions (FIGS. 2B through 2F) from a sunset mood (FIG. 2B) to a daylight look (FIG. 2F).

Figure 7A:
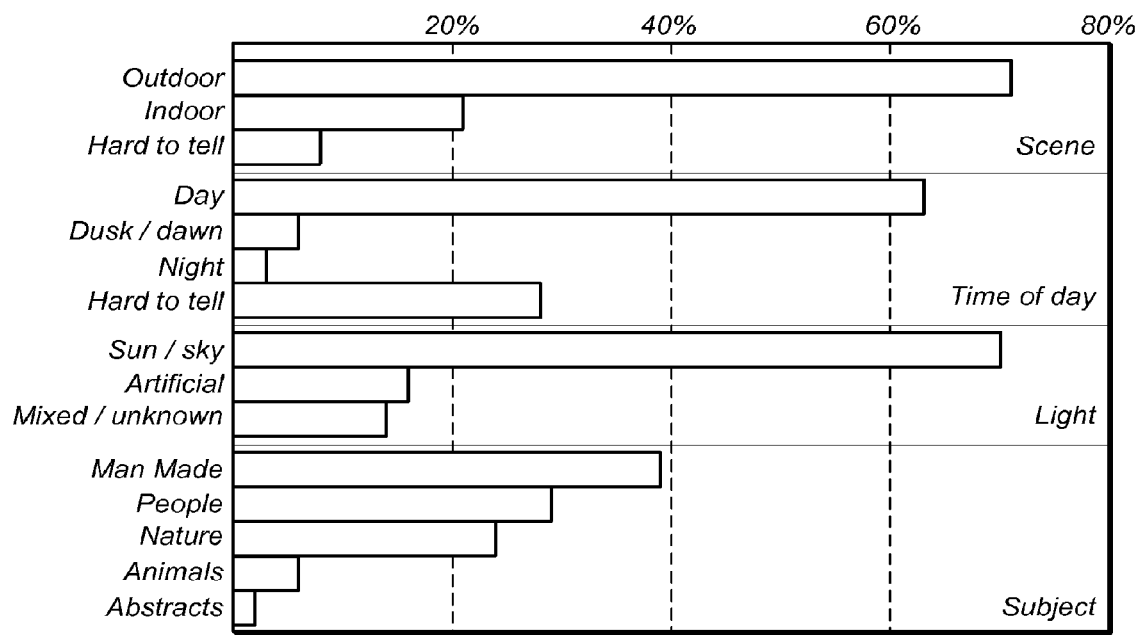
FIG. 7A illustrates an example categorization of an image database that may be used in various embodiments.
Figure 7B:
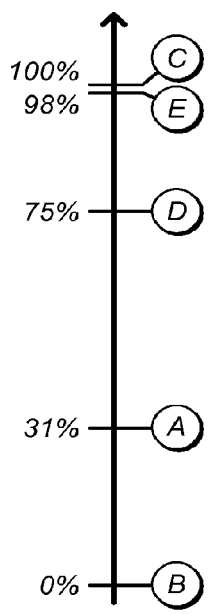
FIG. 7B illustrates a sample ranking of adjusted images that may be used in various embodiments.

One example of a categorization of image database 102, which may be used in various embodiments, is illustrated in FIG. 7A. In one embodiment, a tool (electronic, human, or otherwise) may be used to assign categories to the images. In the illustrated example, each photo has been categorized according to the following categories: scene, time of day, light, and subject. Each category may also include multiple subcategories (e.g., day, dusk, dawn, night, difficult to tell "time of day"). Other image databases 102 may include a different categorical breakdown of images. FIG. 7B illustrates a sample ranking of sets of corresponding adjusted images of one or more raw images 104 that may be used in various embodiments. 100% may correspond to a more favorable set of adjusted images while 0% may correspond to a less favorable set. For example, the photographs of FIGS. 2B-2F may each be one adjusted image in different sets of adjusted images (e.g., the photograph of FIG. 2B belongs to a set A of retoucher A, the photograph of FIG. 2C belongs to a set B of retoucher B, etc.). The sets of adjusted images are represented in FIG. 7B by A-E and may correspond to a collection of images adjusted by a single retoucher or group of retouchers. The sets A-E, may fall somewhere on a ranking scale. As shown in FIG. 7B, sets that include adjusted images shown in FIGS. 2D and 2F (sets/retouchers C and E) may belong to sets with favorable retouching than the set that the adjusted image of FIG. 2C belongs to (set/retoucher B).

Referring back to FIG. 1, in various embodiments, image database 102 may be included as part of automatic image adjustment module 100 and not as a stand alone database. Further, multiple image databases 102 may be present. For instance, the databases may include a black and white database or an HDR database. Image database 102 may allow automatic image adjustment module 100 to enable supervised learning to learn global adjustments, such as global tonal adjustments (e.g., tone curves), as opposed to techniques that seek to train from only adjusted images. In one embodiment, image database 102 may allow automatic image adjustment module 100 to learn image adjustment preferences of a new user from adjustments made to a small set of images. In various embodiments, image database 102 may allow automatic image adjustment module 100 to predict a difference in image adjustment preference for a new user.

In one embodiment, automatic image adjustment module 100 may receive user input 108 via user interface 110. User interface 110 may include a keyboard, touch screen device, microphone, or pointing device (e.g., mouse, trackball, stylus, or other similar devices). In one embodiment, user input 108 may include adjustments made with sliders that correspond to global adjusting of pixel values. User input 108 may include other types of adjustments as well. Adjustments made by user input 108 may be to images of image database 102 or to other images. User input 108 may also include one or more rules that may be used to modify an image adjustment parameter (e.g., a tone curve).

In one embodiment, new image 112 may be an image, not contained in image database 102, to which a global adjustment is made to its pixels. The global adjustment made to the pixels of new image 112 may result in adjusted new image 120. New image 112 may be taken with a different camera and lens combination than the images of image database 102 and may be of any subject matter, scene, and under any conditions or camera settings. New image 112 may be drastically different than any of the images of image database 102.

In one embodiment, automatic image adjustment module 100 may include supervised learning module 114. Supervised learning module 114 may learn adjustments made by a photographer given a collection of image pairs that may include raw images 102 and adjusted images 106. In one embodiment, adjustments to an image may be represented as a remapping curve, or tone curve, from input luminance to output luminance, using the CIE-Lab color space for its reasonably perceptual uniformity. If the image data is RGB data, it may be converted to the luminance color space and the curve may be determined by comparing the original image data to adjusted image data. The curve may be global such that every pixel is treated the same way. In one embodiment, each remapping curve may be represented by a spline with 51 uniformly sampled control points. The spline may be fit to pairs of input-output luminance values in a least-squares sense. Focusing on a select number of control points may allow for a more compact representation of adjustments that may include millions of inputs and outputs. In one embodiment, the exposure may be normalized to the same baseline by linearly remapping the luminance values of each image such that the minimum luminance value may be 0 and the maximum may be 100. In one embodiment, each learning curve may be approximated by using the first principal component analysis (PCA) coefficient. This may allow each curve to be summarized with a single number.

In various embodiments, features of the images included in the remapping curves (and spline) may be represented by descriptors. Descriptors may be computed using various techniques. The features used in supervised learning module 114 may range from low level descriptions of luminance distribution to high-level aspects such as face detection. Features may include intensity distributions, scene brightness, equalization curves, detail-weighted equalization curves, highlight clipping, spatial distributions, and faces. In one embodiment, before computing features, the images may be resized such that their long edge is 500 pixels.

In one embodiment, supervised learning module 114 may use the feature of intensity distributions. Photographers may rely on the distribution of intensities as depicted by a log-scale histogram to adjust the tonal balance. The mean of the distribution of the log-intensity log (R+G+B) may be computed with its percentiles sampled every 2%. Further, the same percentiles may be evaluated on two Gaussian-convoluted versions of the photo ($\sigma=10$ and $\sigma=30$) to account for tonal distributions at larger scales. In one embodiment, the image may be blurred and percentiles may be computed a second time to simulate as if one was looking at the image from farther away.

In one embodiment, supervised learning module 114 may use the feature of scene brightness. Dark and bright scenes may be adjusted differently. Accordingly, scene brightness may be evaluated with $(\hat{Y} \times N^2)/(\Delta t \times ISO)$, where $\hat{Y}$ is the median intensity, N is the lens aperture number that is inversely proportional to the aperture radius, $\Delta t$ is the exposure duration, and ISO is the sensor gain. Settings from the camera such as the lens aperture number may be obtained from image metadata. Scene brightness may be proportional to the light power reaching the camera sensor and may assume that no filter is attached.

Supervised learning module 114 may also use equalization curves. Histogram equalization may allow a coarse approximation of the entire available intensity range. In one embodiment, the cumulative distribution function (CDF) of the image intensities may be computed for each image and projected onto the first five PCA components.

In one embodiment, supervised learning module 114 may use the feature of detail-weighted equalization curves. Detailed regions of images may receive more attention. As a result, supervised learning module 114 may use this feature. Detail-weighted equalization curves may be represented by weighting each pixel by the gradient magnitude, and then computing the first five PCA coefficients of the CDF. The gradients may be estimated with Gaussian derivatives for $\sigma=1$, $\sigma=100$, and $\sigma=200$. This may account for details at different scales.

In one embodiment, supervised learning module 114 may use the feature of highlight clipping. Highlight clipping may measure the amount of highlight that gets clipped. The label values that clip 1%, 2%, 3%, 5%, 10%, and 15% of the image may be computed.

In one embodiment, supervised learning module 114 may use the feature of spatial distributions. This may include the fraction of highlights, midtones, and shadows and how a given tone range is spatially distributed. The intensity range may be split into 10 intervals. For each interval, a 2D spatial Gaussian may be fit to the corresponding pixels. The feature value may be the area of the fitted Gaussian divided by the number of pixels. The xy coordinates of the center of the Gaussian may also be used as a feature that represents the coarse spatial distribution of tones.

Supervised learning module 114 may use the feature of faces in various embodiments. Faces may be a main subject of photographs and the adjustment of faces may be a priority over other content. Further, face adjustment may follow different guidelines than other content. Faces may be detected and the following features may be computed: intensity percentiles within facial regions (if none, the percentiles of the whole image may be used), total area, mean xy location, and number of faces). Any type of face detector may be used. In various embodiments, supervised learning module 114 may use other features such as local histograms, color distributions, and scene descriptors.

By describing the images in terms of features, supervised learning module 114 may use the features to learn how adjustments are made to images, without regard to individual pixels. In one embodiment, the computed features may include 266 numbers for each image.

In one embodiment, supervised learning module 114, given image database 102, may learn to adjust images similarly to the adjustments of adjusted images 106. In one embodiment, supervised learning module 114 may learn global tonal adjustment (e.g., represented by a tone curve), which may not include hue, saturation, color, vibrance, or white balance changes, such that the luminance of an input pixel applied to a remapping curve may give the luminance of the output pixel. For example, adjustments to the luminance channel may include changes to aspects including: black points, highlights, shadows, contrast, brightness and exposure. The data from the curves may be processed by a regression algorithm, such as linear regression, least-squares regression (LSR), least absolute shrinkage and selection operator (LASSO) regression, or Gaussian Processes Regression (GPR). In one embodiment, such processing may take place before the curves have been corrected, as described herein, whereas in other embodiments, such processing may take place after the curves have been corrected. In one embodiment, LASSO may perform a linear regression on a sparse subset of the input dimensions and the algorithm may be trained using 5-fold cross-validation on the training set. Using a regression algorithm may allow supervised learning module 114 to describe image adjustments with a single number. Using a regression algorithm to describe image adjustments may be described as training the algorithm. Image adjustments may be described for the entire image database 102 or for a subset of the images, or training set. The result of the regression algorithm may be a formula (e.g., tone curve) that may be used to predict and make image adjustments to new images 112. In one embodiment, the analysis performed by the regression algorithm on the descriptor vectors may result in a first PCA number for the curve of each image.

Figure 8:
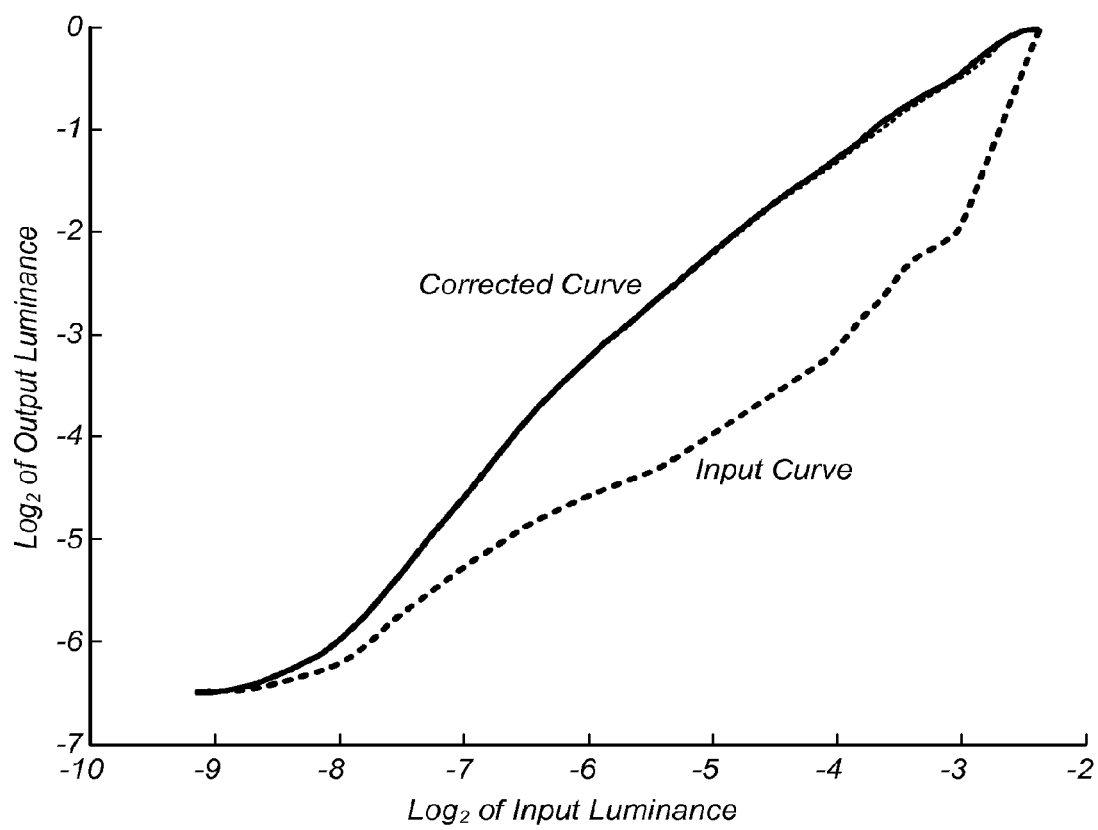
FIG. 8 illustrates an example modified tone curve, according to some embodiments.

In one embodiment, automatic image adjustment module 100 may include adjustment correction module 122. Adjustment correction module 122 may automatically apply one or more rules that are based on and act upon image adjustment parameters (e.g., a tone curve). For example, adjustment correction module 122 may apply rules to one or more tone curves, formulae, or other image adjustment parameter(s) generated by supervised learning module 114 or otherwise received by adjustment correction module 122. In other embodiments, a tone curve or other adjustment parameter(s) may be received as an input or may be generated in a different manner than that described in conjunction with supervised learning module 114. As one example, a tone curve that remaps image intensities may be generated by supervised learning module 114. Rule-based post-processing may analyze the curve and automatically correct or modify it. Example rules may include a maximum threshold for contrast increase or a rule that prevents a loss in brightness. Other rules or safeguards may include: minimum slope, maximum slope, black point clipping, white point clipping, etc. For example, a rule that is designed to prevent too strong of a contrast increase or a loss of brightness may be applied to a tone curve to reduce the contrast or increase the brightness of the tone curve. As a result of applying the rules to the curve, a corrected tone curve may be generated. An example input tone curve and the resulting corrected curve in terms of log-based input and output luminance is shown in FIG. 8.

Figure 9A:
FIGS. 9A-9B show example globally adjusted images created with a tone curve, and a modified tone curve, respectively, according to some embodiments.
Figure 9B:
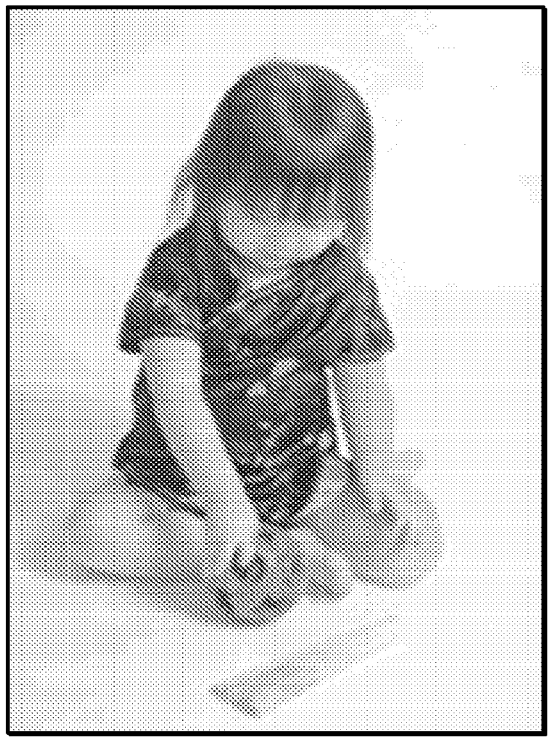

FIGS. 9A-9B illustrates example adjusted images 120, according to some embodiments. FIG. 9A is an example adjusted image 120, which was created without using a corrected tone curve. FIG. 9B is an example an example adjusted image 120 that was created by using a corrected tone curve, according to some embodiments. The tone curve that was applied to an input image that resulted in the corrected image of FIG. 9B was corrected using a maximum slope safeguard rule. Note that the rule (e.g., maximum slope safeguard) may be applied to an adjustment parameter (e.g., tone curve) and not to the actual input image. The rule may be applied to the tone curve resulting in a corrected or modified curve, which may then be applied to an input image.

Turning back to FIG. 1, in some embodiments, the tone correction of adjustment correction module 122 may be applied to each raw curve corresponding to an image pair, or it may be applied to the resulting curves from the regression algorithm. In one embodiment, the curve correction may be applied at run-time. For example, a combination of a variety of curves, and not just a single curve, may be used to adjust a new image. In such an example, the curve correction may be applied to the composite combination of the variety of curves in addition to, or instead of, applying curve correction to each individual curve.

As an example embodiment of image adjustment using GPR, adjustments to new image 112 may proceed in two steps, with the first step corresponding to training the algorithm. During training, GPR may optimize the hyper-parameters of a covariance function so that it may explain the training set. Then, when predicting adjustments to new image 112, known as run-time, the covariance function may be used to drive the combination of a selection of some of the training curves. In one embodiment, given a new image 112, 266 numbers representing features of the new image may be computed and fed to GPR. In one embodiment, the selection of training curves may include selecting several nearest neighbors and combining them in a weighted combination. For example, curves of images 1, 14, 15, 16, 94, 104, 1603, and 2300 may be combined at weights 1%, 3%, 3%, 1%, 35%, 0.3%, 7%, and 49.7% respectively for a particular new image 112. For other new images 112, the nearest neighbors and weights may be different. In one embodiment, each training curve may be represented for a given new image 112. For example, if a training set includes 2500 images, each of the 2500 images may be selected and combined but many of the curves may be weighted by a near-zero percentage, such as 0.001% so that the nearest neighbors may be weighted more heavily and non-nearest neighbors may not be weighted heavily. In one embodiment, training curves with a weight below a certain threshold may be clipped to simplify and expedite computation. Other techniques to generate a curve for new image 112 may be used as well. For example, supervised learning module 114 may find a similar image to new image 112 in image database 102 and apply its curve to new image 112. In one embodiment, when predicting an adjustment to new image 112, a full curve may be used to globally adjust the new image, not a simplified curve that includes only the first PCA component. In other words, in one embodiment, training the algorithm may use just the first PCA coefficient while predicting using the trained algorithm may use a full set of curve parameters. In various embodiments, the algorithm may be trained in another component and not by supervised learning module 114. In such embodiments, the pre-trained algorithm may be used by supervised learning module 114 to adjust new images. Moreover, the curve may be corrected by adjustment correction module 122, for example, based on one or more rules, before it is applied to new image 112. Such correction may be made to each of the curves (e.g., 2500), a select few of the curves, or to a composite curve resulting from a combination of some of the curves. The correction may be applied to the individual curves and to the composite curve, in some embodiments.

Referring back to FIG. 1, in one embodiment, automatic image adjustment module 100 may include transferred adjustment module 116. Transferred adjustment module 116 may learn the adjustments of a new user. The new user may adjust a small set of images S, for example, from image database 102. In one embodiment, S may include tens of images for a user to adjust. For example, S may include 25 images. The small set of images S that the new user adjusts may be a subset of image database 102. In one embodiment, the small set of images S may be the most useful photos of the image database 102 to learn a new user's adjustment. The small set of images S may be selected with a sensor placement technique. In one embodiment, GPR may be run on a large set L of image pairs from image database 102 to compute a covariance function $\Sigma_L$. This may be performed by supervised learning module 114. The covariance function $\Sigma_L$ that is trained on L may be used by GPR to run an interpolation on the curves of the small set S. In one embodiment, the curves of the small set S may be computed by GPR in the same manner the curves were computed for the images of large set S. Given new image 112, GPR may produce weights for the curves of the small set of images S. Descriptors may be computed for new image 112 and then weighted and combined accordingly to generate adjusted new image 120. The computation and weighting may collectively be referred to, in some embodiments, as the transferred adjustment. In various embodiments, one or more of the curves for the small set S may be corrected by adjustment correction module 122, for example, based on one or more rules.

In one embodiment, automatic image adjustment module 100 may include difference learning module 118. Difference learning module 118 may learn the difference in a new user's adjustment preferences over a reference predicted adjustment. In one embodiment, difference learning module 118 may use only a few images that may be arbitrarily selected. Further, the few images may include images that are not included in image database 102. If the images are included in image database 102, sensor placement or other such techniques may not be needed to optimize difference learning module 118. However, in some embodiments, difference learning module 118 may use such techniques to optimize which images a new user adjusts. By randomly choosing pictures for training, difference learning module 118 may learn adjustment preferences on-the-fly. Given new image 112, difference learning module 118 may predict both a reference adjustment and the difference between the reference adjustment and the new user's adjustment. In other words, difference learning module 118 may apply a predictive adjustment followed by a predictive correction to generate adjusted new image 120. In some embodiments, the reference predictive adjustment may be determined by supervised learning module 114, as described herein. In various embodiments, the predictive adjustment and prediction correction may further be corrected, for example, based on one or more rules, by adjustment correction module 122.

In one embodiment, GPR may be trained on a large training set L of images, such as image database 102. Then, reference curves for each photo of a small set of images S may be predicted. The difference between the predicted curves of S and the new user's curves for those images may be computed. The computed differences yield a series of adjustment offsets, o. Given new image 112, a reference adjustment r may be predicted using the covariance $\Sigma_L$ and the adjustments in L. Then, an adjustment offset o may be predicted using the L covariance $\Sigma_L$ and the offsets computed on S. The adjustment offset o may be added to the reference adjustment r such that for new image 112, a combined adjustment r +o may be applied to new image 112 resulting in adjustment new image 120. In various embodiments, the predicted curves, new user's curves, adjustment offsets, reference adjustment, and/or combined adjustments may be corrected by adjustment correction module 122, for example, based on one or more rules.

Correcting image adjustment parameters (e.g., machine-learned/supervised tone curves) used to perform image adjustments may provide for a more robust global tonal adjustment. For example, if a new image is very different from anything in the training set, a tone curve may be corrected such that the corrected curve minimizes extremes and artifacts. Example adjusted images showing such artifacts and the correction resulting in fewer artifacts are shown in FIGS. 9A and 9B, respectively.

Figure 3:
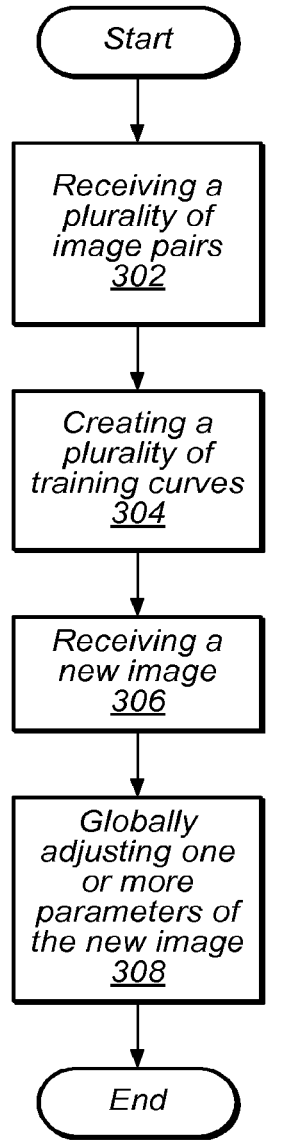
FIG. 3 illustrates a flowchart of an example method for globally adjusting an image, according to some embodiments.

Turning now to FIG. 3, one embodiment of a method of automatically globally adjusting a new image is shown. In one embodiment, automatic image adjustment module 100 may perform the method of FIG. 3. While the blocks are shown in a particular order for ease of understanding, other orders may be used. In some embodiments, the method of FIG. 3 may include additional (or fewer) blocks than shown.

At 302, automatic image adjustment module 100 may receive a plurality of image pairs. In one embodiment, image pairs may include a raw image 104 and a corresponding adjusted image 106. Adjusted image 106 is said to correspond to raw image 104 because it is an adjusted version of the raw image. Automatic image adjustment module 100 may receive, in one embodiment, 5000 image pairs. Automatic image adjustment module 100 may receive additional sets of adjusted images 106 that correspond to raw images 104.

At 304, automatic image adjustment module 100 may generate a plurality of training curves by training a regression algorithm. Each of the plurality of curves may relate one or more parameters of a raw image 104 to a corresponding adjusted image 106 of an image pair. The parameters that the plurality of curves may be based upon may include tonal parameters such as black points, highlights, shadows, contract, brightness and exposure. The parameters may be described in terms of features such as intensity distributions, scene brightness, equalization curves, detail-weighted equalization curves, highlight clipping, spatial distributions, and faces. In one embodiment, a regression algorithm, for example, a GPR algorithm, may be used to compute a training curve for each image pair by analyzing 266 descriptor vectors, given by the described features. Each training curve may be represented with a first PCA coefficient. The plurality of curves may be seen as hyper-parameters of a covariance function that may explain the training set image pairs. In some embodiments, one or more of the curves may be corrected, for example, according to one or more rules or safeguards.

At 306, automatic image adjustment module 100 may receive new image 112. New image 112 may be an image not contained in image database 102. New image 112 may be taken with a different camera and lens combination than those images of image database 102 and may be of any subject matter, scene, and under any conditions or camera settings.

At 308, automatic image adjustment module 100 may globally adjust one or more parameters of new image 112. In one embodiment, globally adjusting one or more parameters of new image 112 may result in adjusted new image 120. In one embodiment, the trained regression algorithm, for example, GPR, may use the covariance function computed in block 304 to drive a combination of training curves to optimize adjustment of a new image. The training curves may be combined in a weighted manner. In one embodiment, the selection of training curves may include selecting several nearest neighbors and combining them in a weighted combination. Further, the curves used to globally adjust one or more parameters of new image 112 may include the fully array of PCA coefficients, and not just the first coefficient. The composite weighted training curve may be applied globally to the luminance of an input pixel to determine the luminance of an output pixel. In some embodiments, performing block 308 may result in adjusted new image 120. In some embodiments, the combined training curves may be corrected, in addition to, or instead of, correcting the individual curves. Such correction may be according to one or more rules (e.g., minimum slope, maximum slope, etc.)

Figure 4:
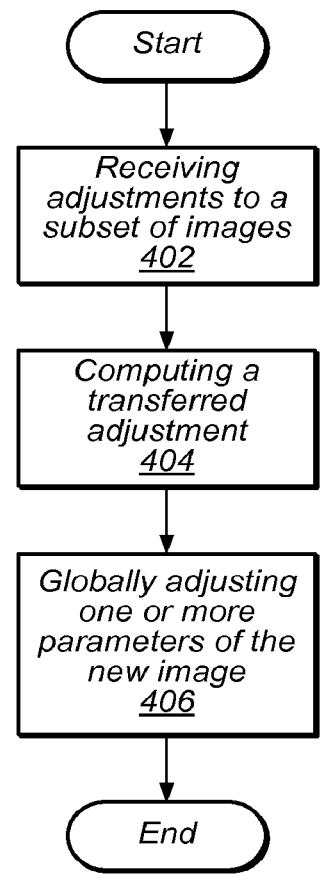
FIG. 4 illustrates a flowchart of an example method for globally adjusting an image based on a user's adjustments, according to some embodiments.

Turning now to FIG. 4, one embodiment of a method of automatically globally adjusting a new image based on a new user's adjustments is shown. In one embodiment, automatic image adjustment module 100 may perform the method of FIG. 4. While the blocks are shown in a particular order for ease of understanding, other orders may be used. In some embodiments, the method of FIG. 4 may include additional (or fewer) blocks than shown.

In one embodiment, the method of FIG. 4 may include blocks 302-306 of the method of FIG. 3. At 402, automatic image adjustment module 100 may receive adjustments to a subset of images. The subset of images may be a subset of image database 102. In one embodiment, the subset of images may be selected such that the subset of images is the most useful to learn a new user's adjustment preferences. In one embodiment, the subset of images may be selected with a sensor placement technique. The subset of images may in the range of tens of images, for example, 20 to 30 images.

At 404, automatic image adjustment module 100 may compute a transferred adjustment by correlating the trained regression algorithm to the adjustment of the subset of images. In one embodiment, curves of the subset of images may be computed by a regression algorithm, such as GPR, in a similar manner to the computation of the curves of the larger set of images. In one embodiment, the covariance function trained on L, from block 304 of FIG. 3, may be used to run GPR interpolation on the curves of the subset of images resulting in the transferred adjustment.

At 406, automatic image adjustment module 100 may globally adjust one or more parameters of new image 112. In one embodiment, the transferred adjustment that results from the GPR interpolation on the subset of images may be applied to new image 112. Given new image 112, GPR may produce weights for the curves of the subset of images. In one embodiment, descriptors may be computed for new image 112 and then weighted and combined accordingly. In some embodiments, performing block 406 may result in adjusted new image 120. In various embodiments, the curves may be corrected according to one or more rules.

Figure 5:
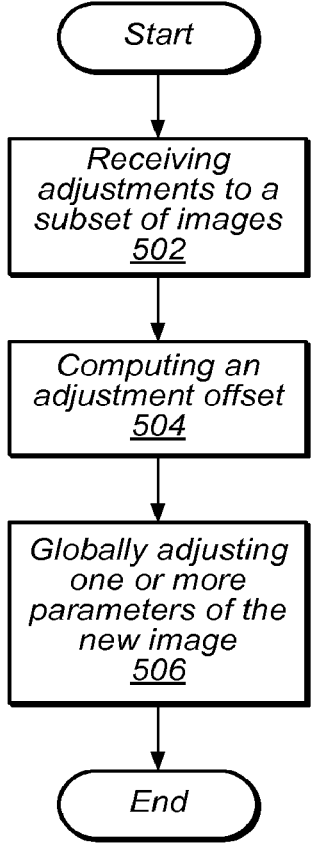
FIG. 5 illustrates a flowchart of an example method for globally adjusting an image by using the difference between a predicted adjustment and a user's adjustment, according to some embodiments.

Turning now to FIG. 5, one embodiment of a method of automatically globally adjusting a new image based on the difference between a new user's adjustments and predicted adjustments is shown. In one embodiment, automatic image adjustment module 100 may perform the method of FIG. 5. While the blocks are shown in a particular order for ease of understanding, other orders may be used. In some embodiments, the method of FIG. 5 may include additional (or fewer) blocks than shown.

In one embodiment, the method of FIG. 5 may include blocks 302-306 of the method of FIG. 3. At 502, automatic image adjustment module 100 may receive an adjustment to a subset of images. The subset of images may be a subset of image database 102 or it may be a set of images not included in image database 102. The subset of images may include a few images (e.g., 2 or 3). The adjustments to the subset of images may be represented by descriptor vectors. For example, in one embodiment, the adjustments may be represented by 266 values.

At 504, automatic image adjustment module 100 may compute an adjustment offset. The adjustment offset may be the difference between the adjustment to the subset of images and the curves for each image. In one embodiment, reference curves for each image of the subset of images may be predicted. The difference between the predicted curves of the subset of images and the new user's curves (which may be computed from the descriptor vectors) for those images may be computed. The computed differences may yield a series of adjustment offsets, o.

At 506, automatic image adjustment module 100 may globally adjust one or more parameters of new image 112. Globally adjusting one or more parameters of new image 112 may include the trained regression algorithm performing a weighted combination of the plurality of curves to new image 112 resulting in a predictive adjustment. The adjustment offset (predictive correction) may then be applied to the predictive adjustment. In some embodiments, performing block 506 may result in adjusted new image 120. In various embodiments, the curves, adjustment offsets, or other adjustment parameters may be corrected, according to one or more rules or safeguards.

Figure 6:
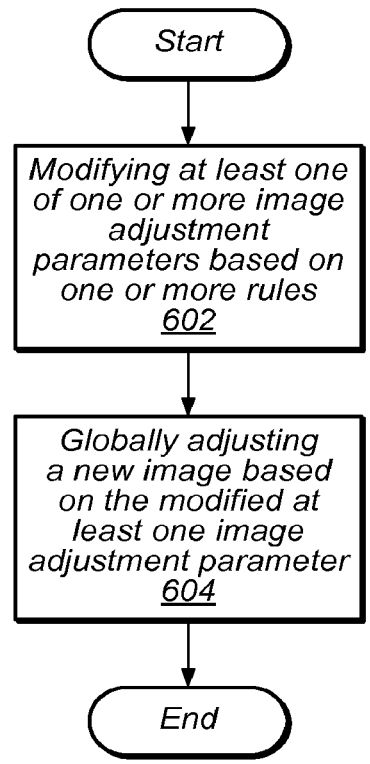
FIG. 6 illustrates a flowchart of an example method for automatically modifying an image adjustment parameter, according to some embodiments.

Turning now to FIG. 6, one embodiment of a method of automatically correcting one or more image adjustment parameters (e.g., a tone curve) is shown. In one embodiment, automatic image adjustment module 100 may perform the method of FIG. 6. While the blocks are shown in a particular order for ease of understanding, other orders may be used. In some embodiments, the method of FIG. 6 may include additional (or fewer) blocks than shown. For example, the method of FIG. 6 may include one or more blocks of the methods of FIGS. 3-5.

As shown at 602, an automatically predicted adjustment (e.g., image adjustment parameter(s)) may be modified. The automatically predicted adjustment may define a global adjustment to an image. The automatically predicted adjustment may include a tone curve, which, in some embodiments, may be generated based on a machine learning prediction (e.g., supervised learning) technique. For example, one or more tone curves and/or a composite tone curve, such as one generated according to one or more of the methods of FIG. 3-5, may be the automatically predicted adjustment being modified. Such modification may be performed according to one or more rules, or safeguards. Example rules may include: minimum slope, maximum slope, black point clipping, white point clipping, a contrast increase limit, a loss of brightness limit, etc. In some embodiments, a rule may include an upper and/or a lower bound for one of the adjustment parameters. The modification or correction may be applied to one or more individual tone curves, to a composite curve, or to both. Still in other embodiments, an automatically predicted adjustment other than a tone curve may be modified. Such other automatically predicted adjustments may likewise be generated according to machine-based (e.g., supervised) learning prediction.

In various embodiments, an automatically predicted adjustment may be a tone curve generated by supervised learning module 114. In other embodiments, automatically predicted adjustment may be a tone curve generated in another manner. Or, in some instances, an already generated automatically predicted adjustment may be received from elsewhere (e.g., precomputed and received as user input). Still, in other embodiments, an automatically predicted adjustment other than a tone curve may be generated and/or received. Generating or receiving the automatically predicted adjustment may occur before performing block 602, in some embodiments.

In one embodiment, multiple automatically predicted adjustments (e.g., multiple tone curves) may be modified/corrected. In another embodiment, a composite tone curve made up of multiple tone curves may be modified after the tone curves have been combined together.

At 604, a new image may be globally adjusted based on the modified automatically predicted adjustment resulting in adjusted new image 120. In one embodiment, the trained regression algorithm, for example, GPR, may use a covariance function (e.g. as computed in block 304) to drive a combination of training curves to optimize adjustment of a new image, with one or more of the training curves having been corrected at block 602. The training curves, including the corrected or modified training curve(s), may be combined in a weighted manner. In one embodiment, the selection of training curves may include selecting several nearest neighbors and combining them in a weighted combination. In another embodiment, the modified training curve may be a modification to an already combined, weighted curve. In any event, the curves used to globally adjust one or more parameters of new image 112 may include the fully array of PCA coefficients, and not just the first coefficient. The composite, weighted, corrected training curve may be applied globally to the luminance of an input pixel to determine the luminance of an output pixel. In some embodiments, performing block 604 may result in adjusted new image 120.

Example System

Figure 10:
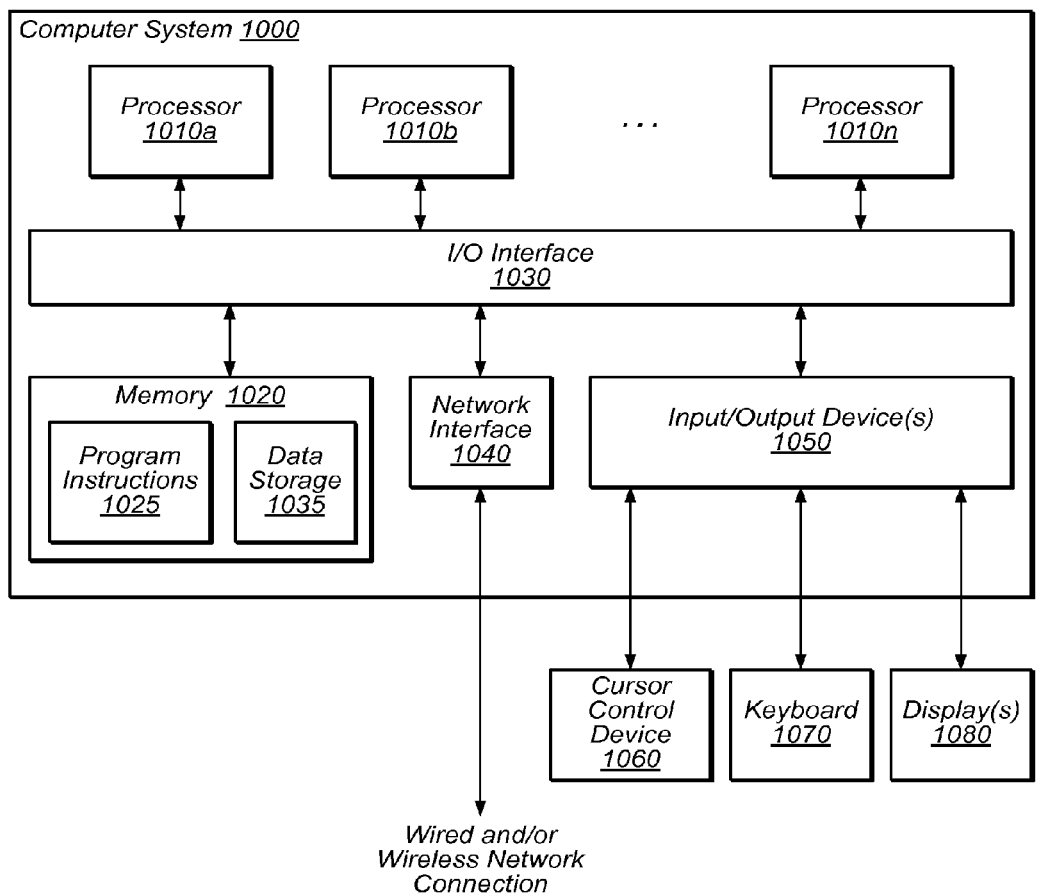
FIG. 10 illustrates an example computer system that may be used in embodiments.

Embodiments of automatic image adjustment parameter correction techniques may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, automatic image adjustment parameter correction methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments as described herein, and data storage 1035, comprising various data accessible by program instructions 1025. In one embodiment, program instructions 1025 may include software elements of embodiments as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of an adjustment correction module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present disclosure may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method comprising:
    globally adjusting an image by a computing system based on at least one tone curve that defines a global adjustment that is automatically predicted and configured to be applied to an image, the global adjustment being based at least in part on a difference between a predicted adjustment and a user's adjustment; and
    automatically correcting the globally adjusted image by the computing system based on a rule, the rule defining an upper or lower bound for the correction.

2. A method of claim 1, wherein the tone curve is based on a machine learning prediction.

3. A method of claim 2, wherein the machine learning prediction includes a supervised learning prediction.

4. A method of claim 1, wherein the at least one tone curve is generated as part of a plurality of curves that each relate one or more parameters of a raw image to a corresponding adjust image of an image pair and the correcting includes modifying the at least one tone curve based on the rule.

5. A method of claim 4, wherein the at least one tone curve is generated at least in part using a regression algorithm.

6. A method of claim 1, wherein the globally adjusting the image includes globally adjusting one or more tonal parameters of the image.

7. A method comprising:
    receiving an automatically predicted adjustment by a computing system, the automatically predicted adjustment describing a global adjustment to an image, the global adjustment being based at least in part on a difference between a predicted adjustment and a user's adjustment; and
    modifying the automatically predicted adjustment by a computing system based on a rule that includes a bound limiting an amount for the modifying for the automatically predicted adjustment such that the modified automatically predicted adjustment is configured to be applied to an image.

8. A method of claim 7, wherein the automatically predicted adjustment is based on a machine learning prediction.

9. A method of claim 7, wherein the automatically predicted adjustment is a tone curve.

10. A method of claim 7, wherein the automatically predicted adjustment is generated using machine learning.

11. A method of claim 10, wherein the machine learning includes a supervised learning prediction.

12. A method of claim 7, wherein the automatically predicted adjustment is generated as part of a plurality of curves that each relate one or more parameters of a raw image to a corresponding adjust image of an image pair and the modifying includes modifying the at least one tone curve based on the rule.

13. A method of claim 7, wherein the automatically predicted adjustment is generated at least in part using a regression algorithm.

14. A method of claim 7, wherein the globally adjusting the new image includes globally adjusting one or more tonal parameters of the new image.

15. A computing system comprising:
    one or more processors and at least one memory that maintains instructions that are executable by the one or more processors to cause operations to be performed comprising:
        modifying at least one tone curve by a computing system based on a rule that includes a bound limiting an amount for the modifying for the at least one tone curve, the at least one tone curve defining a global adjustment that:
            is automatically predicted; and
            that is configured to be applied to an image, the global adjustment being based at least in part on a difference between a predicted adjustment and a user's adjustment; and
        globally adjusting a new image by the computing system based on the modified tone curve.

16. A method of claim 15, wherein the tone curve is based on a machine learning prediction.

17. A method of claim 15, wherein the at least one tone curve is generated at least in part using a regression algorithm.

18. A method of claim 15, wherein the globally adjusting the new image includes globally adjusting one or more tonal parameters of the new image.

* * * * *